US006736586B2

(12) United States Patent
Harris et al.

(10) Patent No.: US 6,736,586 B2
(45) Date of Patent: May 18, 2004

(54) MULTIPLE SET BLOCK LIFTING DEVICE

(76) Inventors: Loren Harris, 17311 157th Ave. SE., Snohomish, WA (US) 98290; David Harris, 12327 Roosevelt Rd., Snohomish, WA (US) 98290; Brett Harris, 16301 107th Ave. NE., Bothell, WA (US) 98011

( * ) Notice: Subject to any disclaimer, the term of this patent is extended or adjusted under 35 U.S.C. 154(b) by 0 days.

(21) Appl. No.: 10/289,755

(22) Filed: Nov. 7, 2002

(65) Prior Publication Data

US 2003/0086779 A1 May 8, 2003

Related U.S. Application Data

(60) Provisional application No. 60/338,001, filed on Nov. 8, 2001.

(51) Int. Cl.[7] .......... B65G 59/02
(52) U.S. Cl. .......... 414/626; 414/589; 294/93
(58) Field of Search .......... 414/626, 589, 414/623; 294/93, 94, 89

(56) References Cited

U.S. PATENT DOCUMENTS

| | | | | | |
|---|---|---|---|---|---|
| 4,005,783 | A | * | 2/1977 | Pasch | 414/267 |
| 4,474,400 | A | | 10/1984 | Toffolon | 294/97 |
| 5,480,279 | A | * | 1/1996 | Stauber | 414/792.9 |
| 5,490,702 | A | | 2/1996 | Fleming | 294/97 |
| 5,704,675 | A | | 1/1998 | Reiley | 294/97 |
| 5,797,638 | A | | 8/1998 | Yamazaki et al. | 294/95 |
| 6,370,837 | B1 | * | 4/2002 | McMahon et al. | 52/749.14 |
| 6,481,769 | B1 | | 11/2002 | Harris et al. | 294/62 |

* cited by examiner

*Primary Examiner*—Joseph A. Dillon
(74) *Attorney, Agent, or Firm*—Dean A. Craine

(57) ABSTRACT

A multiple block lifting device that includes two support arms pivotally connected at the opposite ends enabling the support arms to move from a closed, parallel configuration to an open, linear configuration. Attached to each arm is at least one block attachment unit that selectively connects to one block. In the preferred embodiment, the movement of the support arms and each block attachment unit is controlled by hydraulic cylinders and a main control valve. When paired blocks are aligned on a pallet, the device is in a closed, parallel configuration, and each block lifting unit engages a block. The device is then lifted and the support arms are aligned in the open, linear configuration. Each arm may include an optional extension arm that enables the device to lift additional blocks.

20 Claims, 7 Drawing Sheets

MULTIPLE SET BLOCK LIFTING DEVICE

This is a utility patent application which claims benefit of U.S. Provisional Application No. 60/338,001 filed on Nov. 8, 2001.

BACKGROUND OF THE INVENTION

1. Field of the Invention

This invention pertains to devices used to lift concrete building or retaining wall blocks into position on a wall, and more particularly, to such devices that enable several pairs of blocks to be simultaneously lifted from their original positions on a pallet and shifted to varied positions on a wall.

2. Description of the Related Art

Lifting devices that are attachable to backhoes to help construction workers more efficiently set concrete blocks in place on building or retaining walls are widely known. These devices eliminate the need for workers to individually lift and position the heavy concrete blocks, saving time, physical energy, and labor cost. Unfortunately, such devices are able to lift and position only one concrete block at a time, which makes wall building a slow, tedious process.

Retaining wall blocks are shipped from the manufacturer on pallets. Typically, the pallets 95, 96 come in two sizes: 3'×3' and 3'×4', as shown in FIGS. 7 and 8, respectively. The 3'×3' pallet 95 has four pairs of blocks, while the 3'×4' pallet 96 has six pairs of blocks. Each block in a pair of blocks is longitudinally aligned in an end-to-end orientation with the other. Each pair of blocks is longitudinally aligned in rows.

In order to expedite the process and reduce labor and rental equipment costs, what is needed is a lifting device that allows a backhoe operator to easily and securely lift multiple pairs of concrete blocks directly off the pallet and then adjust their relative positions for direct placement on a retaining wall.

SUMMARY OF THE INVENTION

It is an object of the present invention to provide a device for lifting a plurality of blocks from a pallet and position them on a retaining wall.

It is another object of the present invention to provide such a device that lifts the concrete blocks from their original positions on a shipping pallet.

It is a further object of the invention to provide such a device that lifts blocks that are positioned in rows and aligned in an end-to-end manner with an adjacent block on a pallet.

These and other objects of the invention which will become apparent are met by the lifting device disclosed herein that includes two horizontal support arms, each with a plurality of block attachment units mounted on the arm's outside surface and designed to attach to blocks in their original locations on a pallet, securely lift them and place them on a retaining wall. The support arms are pivotally connected at their ends and move between a closed, parallel configuration to an open, linear configuration. A means for controlling the pivotal movement of the support arms, such as central hydraulic cylinder, is disposed between the two support arms, and used to selectively control their movements between the two configurations.

Each block attachment unit includes a downward extending sleeve member designed to slide freely into a hole formed on a block. Located inside the sleeve member is hole engaging member that selectively engages the sides of the hole to temporarily attach the block attachment unit to the block. In one embodiment, the hole engaging member is an actuator arm that moves longitudinally inside the sleeve member and moves a gripping member between engaged and disengaged positions against the inside surface of the hole. Each actuator arm is connected to a hydraulic cylinder that connects to a main control valve mounted on the device that controls the operation of the hydraulic cylinders used to control the block attachment units and the movement of the support arms.

Fixed to each arm is a lifting bracket which connects to a chain or cable suspended from a backhoe which is used to lift the lifting device in a horizontal orientation over the pallet or wall.

In the first embodiment, the lifting device includes two block attachment units evenly spaced apart on each arm at selected distances so that four pairs of blocks placed in rows facing each other may be lifted. During use, the support arms are initially positioned in the closed, parallel configuration and lowered over the four blocks. After each sleeve member on each block attachment unit is inserted into a central hole on a block, the hydraulic cylinder on each block attachment unit is activated to move the actuator arm and to force the gripping member outward against the inside surface of the hole, applying sufficient pressure to lift and hold each block. The lifting device is then raised so that the blocks clear the other remaining blocks on the pallet and allow the support arms to be moved into a linear configuration.

When the support arms are moved into a linear configuration the blocks are aligned side-by-side and face the same direction. The lifting device is then properly positioned over the wall and lowered to properly position the blocks on the wall. The hydraulic cylinder on each block attachment unit is then deactivated to release the actuator arm and disengage the gripping member from the sides of the hole. The lifting device is then raised so that the sleeve members clear the holes and the central hydraulic cylinder is activated to realign the support arms in a closed, parallel configuration. The lifting device is then repositioned over the pallet to attach to four more pairs of blocks.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

DESCRIPTION OF THE PREFERRED EMBODIMENT(S)

Figure 1:
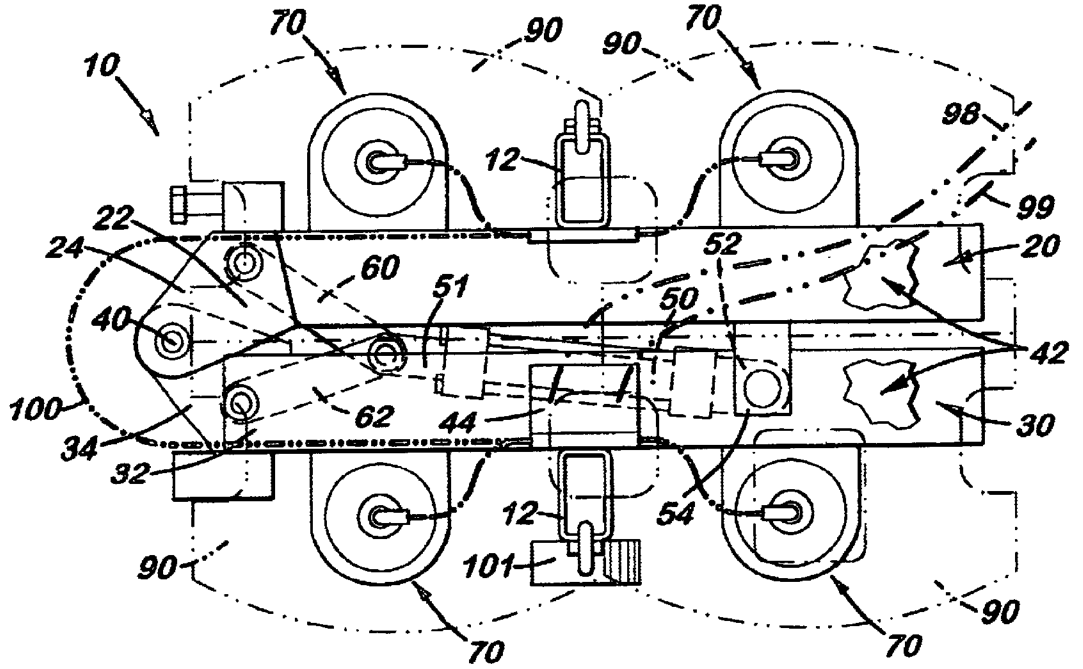
FIG. 1 is a top plan view of the multiple set block lifting device shown in a closed position over two pallets.
Figure 2:
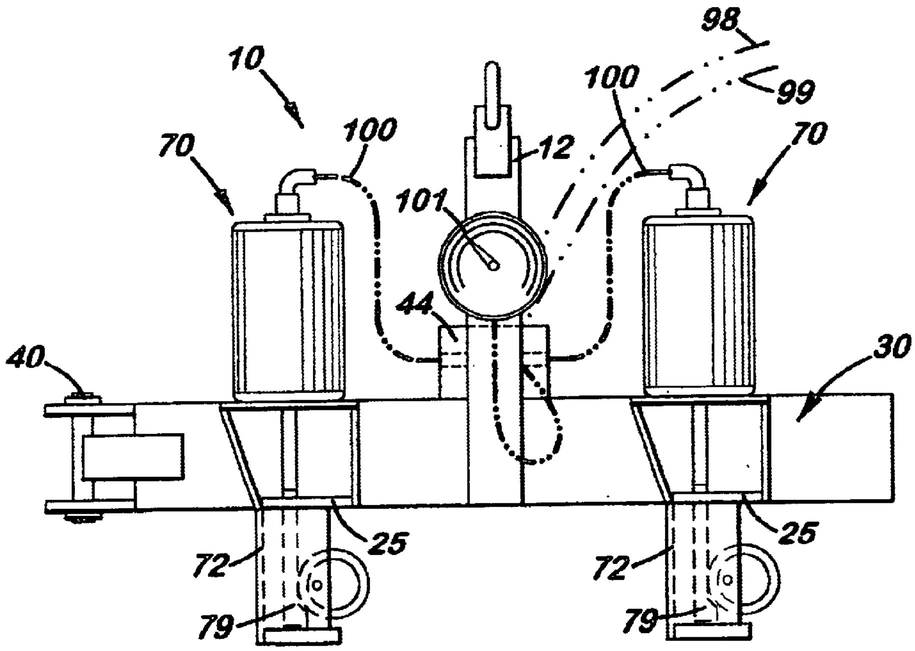
FIG. 2 is a side elevational view of the device.

Referring to the accompanying Figs., there is shown and described a multiple block lifting device 10 disclosed herein that includes two support arms 20, 30 pivotally connected at their proximal ends 22, 32, allowing the support arms 20, 30 to move from a closed, parallel configuration in which the support arms 20, 30 are side-by-side and adjacent to one another, to an open linear configuration in which the support arms 20, 30 are longitudinally aligned. Attached to the proximal ends 22, 32 of the two support arms 20, 30 are two overlapping brackets 24, 34. A hole (not shown) is formed near the ends of each bracket 24, 34 which is designed to receive a bolt 40. During assembly, the holes are aligned and registered and the bolt 40 is inserted therein to pivotally connect the support arms 20, 30 together.

Figure 3:
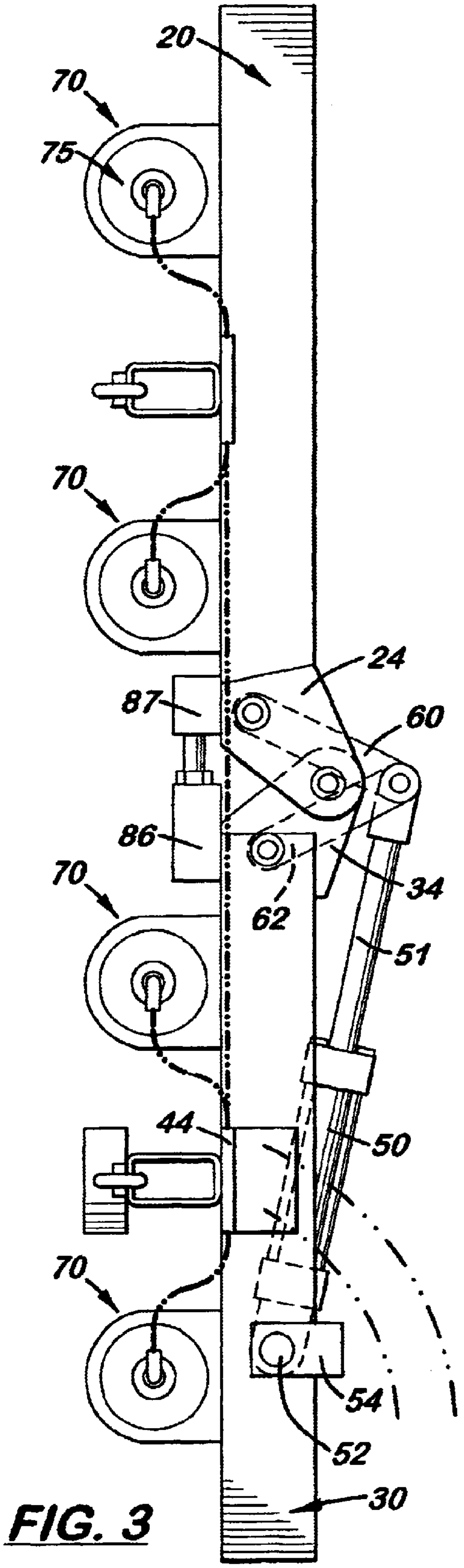
FIG. 3 is a top plan view of the device shown in an open configuration.

The support arms 20, 30 are made of square tubular material with a longitudinally aligned space 42 formed therein. Located inside the space 42 is an arm control hydraulic cylinder 50. The inside surface of both support arms 20, 30 is open. The first end 52 of the cylinder 50 is attached to a bracket 54 located near the central axis and attached to the support arm 20. The opposite second arm 56 of the plunger 51 is pivotally attached to two linking arms 60, 62. The opposite ends of the linking arms 60, 62 are attached to the two brackets 24, 34 attached to the proximal ends 22, 32 of the support arms 20, 30, respectively. During operation, the cylinder 50 is activated to move the support arms 20, 30 from a closed, parallel configuration, to an open linear configuration, as shown in FIGS. 1 and 3, respectively. Attached centrally on each support arm 20, 30 is a vertically aligned lifting plate 12 that attaches to two short chains or cable members 13. The upper ends of the cable members 13 are attached to the ring 14 which in turn attaches to a hook or similar element on a crane or backhoe.

Attached to the outside surfaces of each arm 20, 30 is at least one block attachment unit 70. Each block attachment unit 70 includes a downward extending sleeve member 72 designed to fit into the central hole 91 on a block 90. The sleeve member 72 is mounted to the bottom surface of a lower plate 25 that extends laterally from the outside surface of each support arm 20, 30. The sleeve member 72 is hollow and designed to receive a longitudinally aligned actuator arm 73 attached to a vertically aligned, secondary hydraulic cylinder 75 located on an upper plate 74. The actuator arm 73 that extends downward and longitudinally aligned inside the sleeve member 72. The end of the actuator arm 73 is connected to the wedge member 77 which, during operation, moves longitudinally upward and downward inside the sleeve member 72 by the secondary hydraulic cylinder 75.

Figure 4:
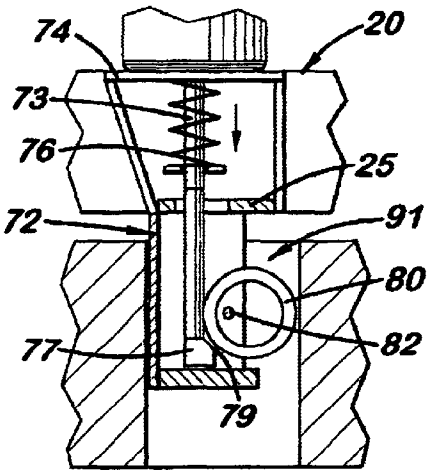
FIG. 4 is a sectional, side elevational view of the device showing the sleeve member disposed into the hole in a block with the gripping member in a disengaged position with the block.
Figure 5:
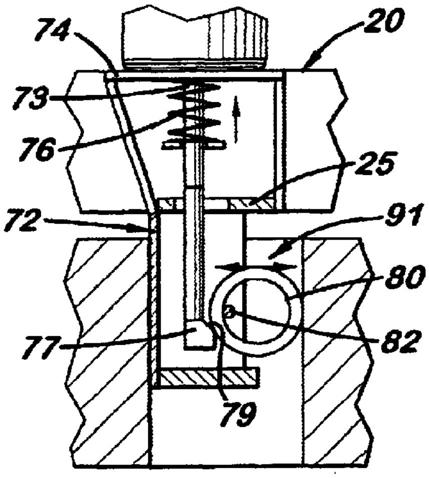
FIG. 5 is a sectional, side elevational view of the device showing the gripping member in an engaged position with the block.
Figure 6:
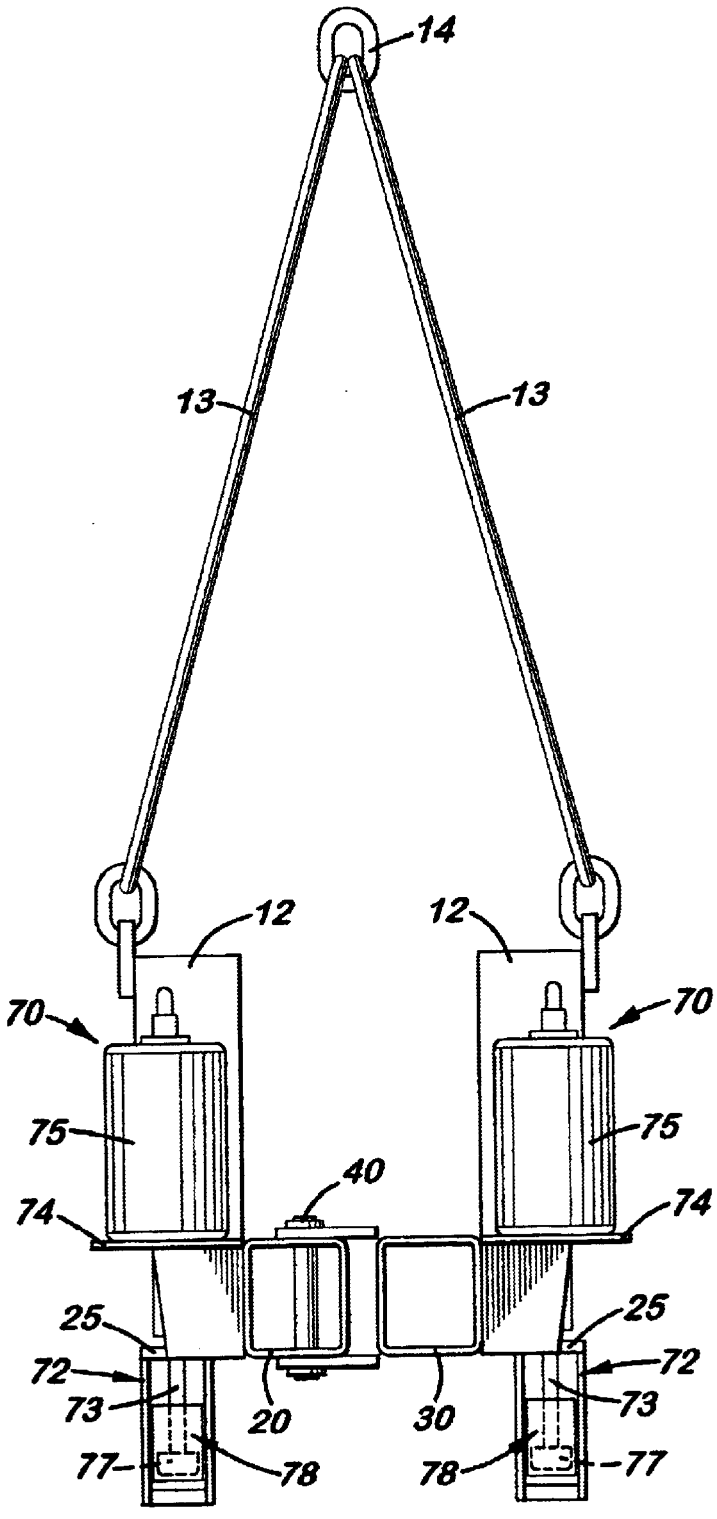
FIG. 6 is a rear elevational view of the device shown in a closed position.

As shown in FIGS. 4–6, the sleeve member 72 includes a side opening 78 through which a gripping member 80 may partially extend. During use, the gripping member 80 moves upward and outward through the side opening 78 to disengage and press against the side of the hole 91 when the sleeve member 72 is inserted into the central hole 91.

The upper plates 74 used to hold the hydraulic cylinders 50 are equally spaced apart and attached to the inside surface of each support arm 20, 30 so that they do not contact the opposite arm counterpart when the support arms 20, 30 close into the closed, parallel configuration. Attached to one support arm 20 is an adjustment nut 87 that contacts a stop surface 86 mounted on the opposite support arm 30 to allow the user to longitudinally align the two support arms 20, 30.

During operation, the gripping member 80 contacts an inclined surface 79 formed on the wedge member 77. Formed inside the sleeve member 72 is a transversely aligned pin 82 that extends through the gripping member 80 to loosely hold it inside the sleeve member 72 yet allow the gripping member 80 to laterally extend through the side opening 78. When the actuator arm 73 is moved longitudinally upward and downward inside the sleeve member 72 by the secondary hydraulic cylinder 75, the inclined surface 79 presses against the outer surface of the gripping member 80, forcing it outward against the inside surface of the hole 91. When the actuator arm 73 is moved downward, the gripping member 80 is allowed to fall back into the sleeve member 72 and away from the inside surface of the hole 91.

When paired blocks 90 are aligned on a 3+×3' pallet 95, the backhoe operator controls the device 10 to configure the support arms 20, 30 in their parallel configuration to lift two side-by-side pairs of blocks 90 simultaneously. In a second embodiment, three sets of paired blocks 90 aligned on a 3'×4" pallet 96 may be simultaneously lifted using two extensions 110, 120 that bolt onto the distal ends of the support arms 20, 30. As the pairs of blocks 90 are carried by the device 10 to their destination on a retaining wall, the support arms 20, 30 are hydraulically opened clamshell style, allowing the blocks 90 to separate from their face-to-face, paired configuration to a linear one in which the faces of the blocks 90 all point in the same direction. The device 10 then releases the blocks 90 in position on a retaining wall, eliminating the need for manual adjustment of the blocks 90.

Figure 7:
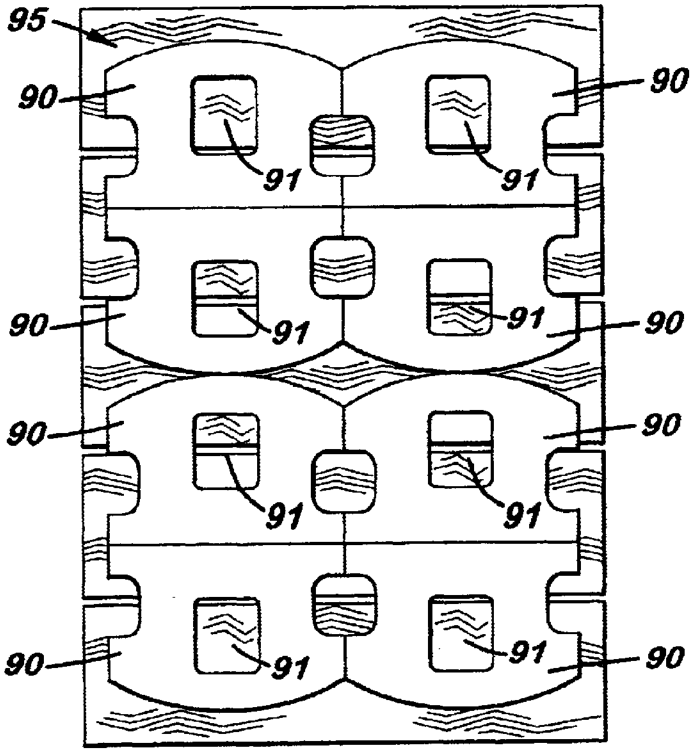
FIG. 7 is a top plan view of a 3×3 ft pallet carrying four pairs of blocks found in the prior art.

In the first embodiment, the lifting device 10 is designed to be used with four pairs of blocks 90 placed in two rows facing each other on a 3+×3' pallet 95, as shown in FIG. 7. During use, the device's horizontal support arms 20, 30, which are initially positioned in the parallel configuration, are lowered onto the blocks 90 so that the four U-shaped housings may be simultaneously inserted into the four respective central holes 91 of two of the four pairs of blocks 90 configured in their face-to-face rows on a pallet 95. As each sleeve member 72 is pressed into the hole 91 of a block 90, each gripping member 80 located within the sleeve member 72 is forced inward against the inside surface of the hole 91.

Figure 8:
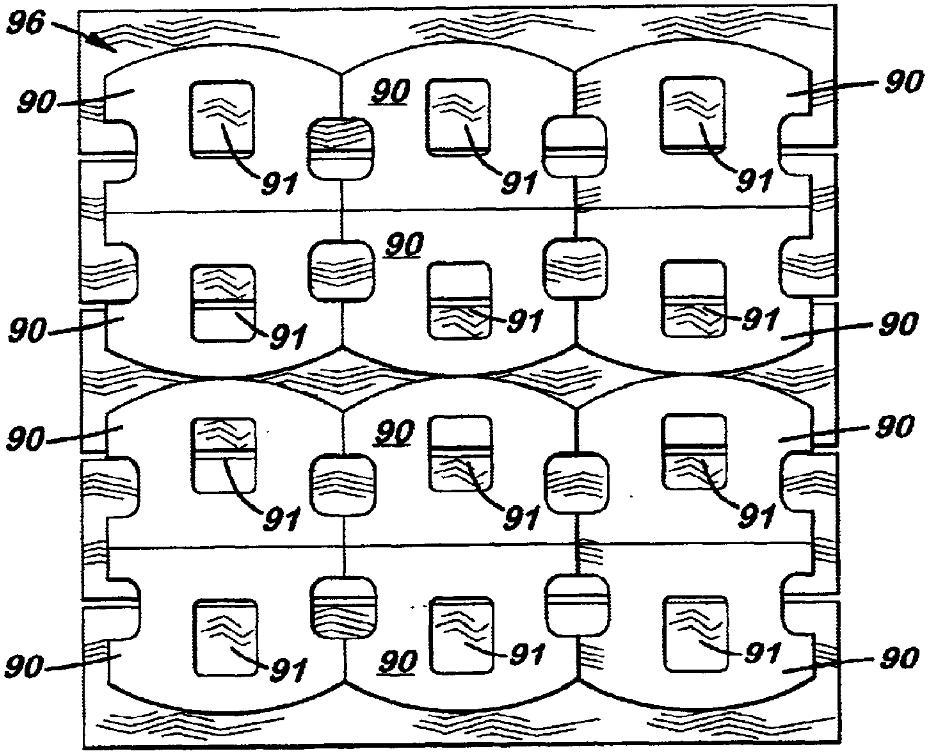
FIG. 8 is a top plan view of a 4×4 ft pallet carrying six pairs of blocks found in the prior art.
Figure 9:
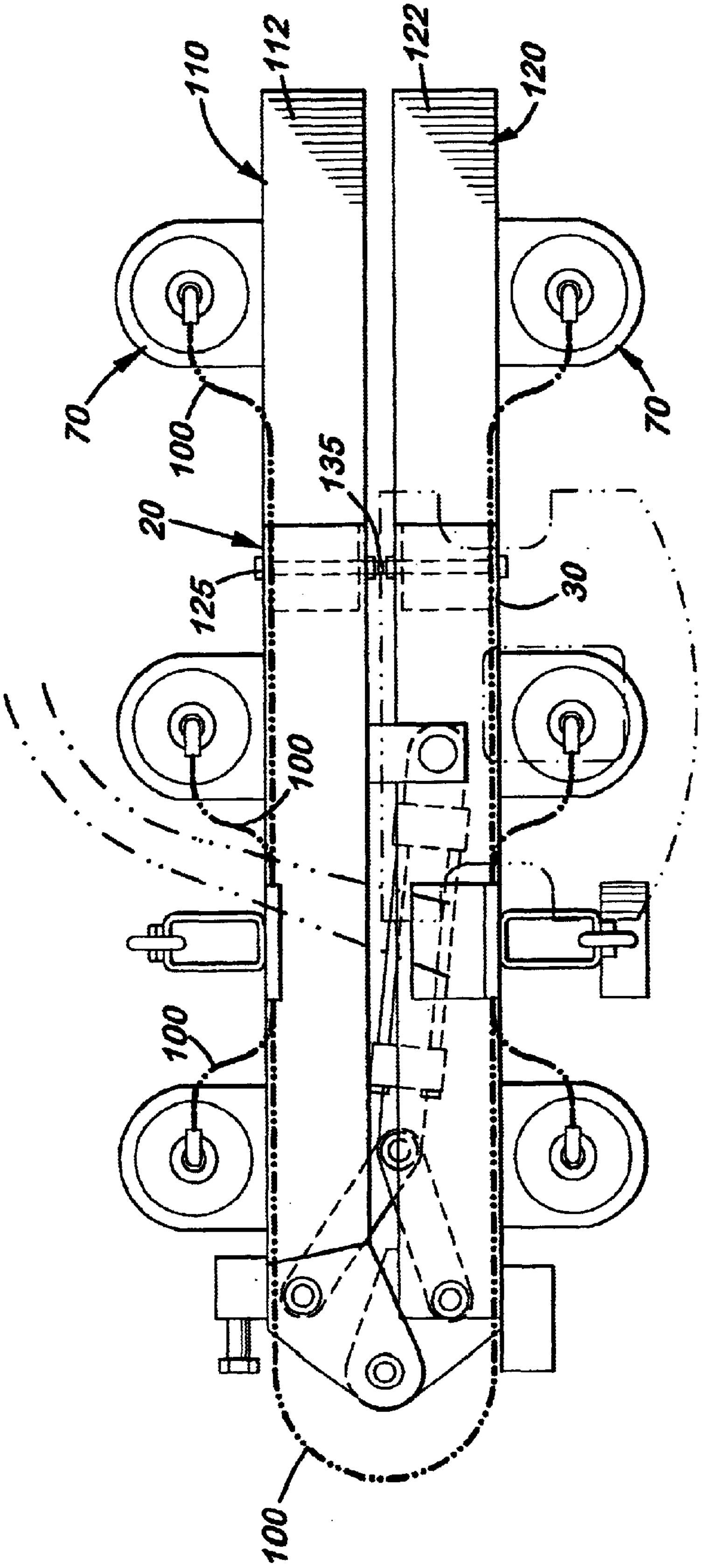
FIG. 9 is a top plan view of a second embodiment of the device shown in a closed position.

In the second embodiment shown in FIG. 9, the support arms 20, 30 of the lifting device 10 are fitted with extensions 110, 120 so they may simultaneously pick up three pairs of blocks 90 arranged in paired rows as they are shipped on a 3'×4' pallet 96, as shown in FIG. 8. Each extension 110, 120 includes at least one block attachment unit 70 located on the same side of the support arms 20, 30 and equally spaced apart from the other attachment units 70. The extensions 110, 120 include extension arm 112, 122, respectively, that slide into the distal ends of the support arms 20, 30. Bolts 125 and nuts 135 are used to securely attach the extension arms 112, 122 and the support arms 20, 30 together to allow the support arms 20, 30 to operate in a similar manner as the first embodiment, except that three pairs of the blocks 90 may be transported simultaneously instead of two pairs.

The arm control hydraulic cylinder 50 and the vertically aligned hydraulic cylinder 75 on each block attachment unit 70 are all connected to a main control valve 44 via a connection hose 100. The inlet and outlet tubes 45, 46, respectively, on the main control valve 44 that connects to the hydraulic system (not shown) on the backhoe. A pressure gauge 101 may be connected to the main control valve 44.

Figure 10:
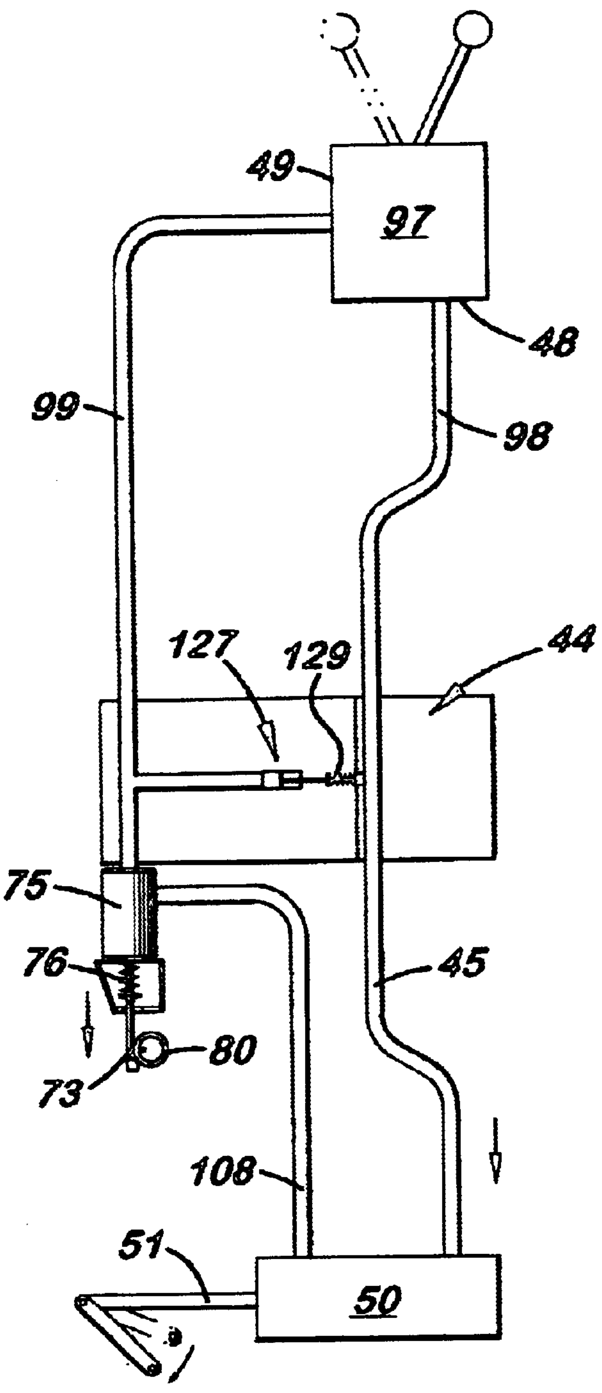
FIG. 10 is an illustration of the main control valve.
Figure 11:
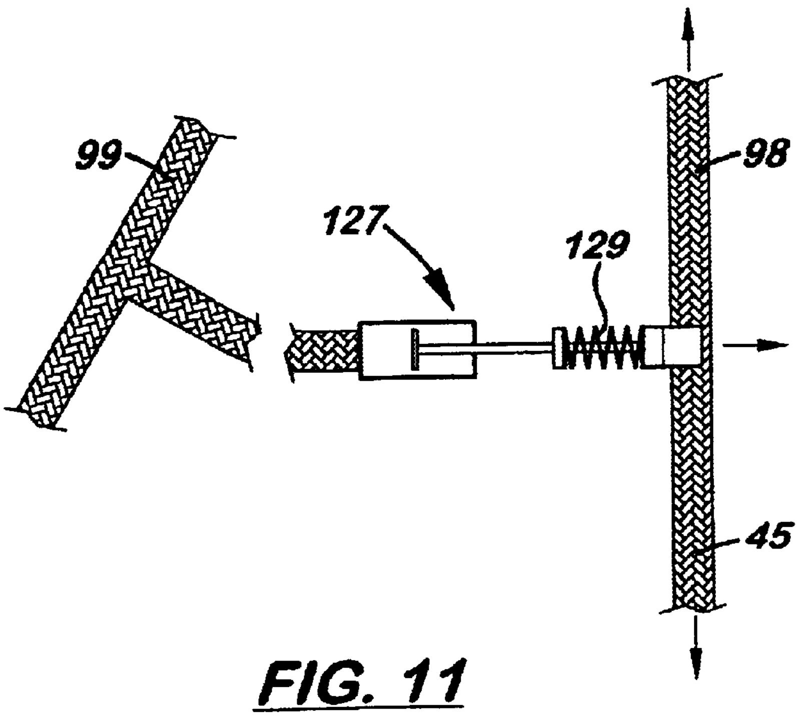
FIG. 11 is an illustration of the spring valve in the control valve shown in a closed position.
Figure 12:
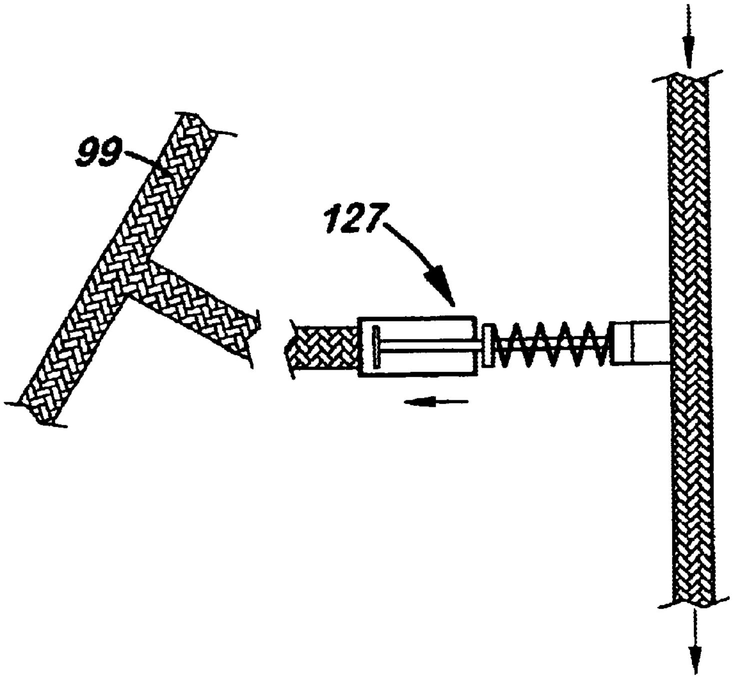
FIG. 12 is an illustration of the spring valve in an open position.

As shown in FIG. 10, the main valve 44 is connected to two fluid lines 98, 99. The first fluid line 98 connects to the outlet port 48 on the supply line 45 to the backhoe hydraulic system 97. The second fluid line 95 connects to the inlet port 49 on the backhoe hydraulic system 97 The main valve 44 includes a spring valve 129 disposed between the second fluid line 99 and a third supply line 45 that extends from the main valve 44 and connects to the four arm control cylinders 50. The spring valve 127 is forced open when pressure in the second fluid line 99 exceeds approximately 100 lbs/ sq. in. pressure, thereby enabling hydraulic fluid to flow to the arm control cylinders 50. When fluid is delivered to the arm control hydraulic cylinder 50, the plunger 51 in the arm control hydraulic cylinder 50 extends to move the support arms 20, 30 to an open, linear configuration.

When the lifting device 10 is initially connected to the backhoe and the second line 99 is pressurized, it causes the secondary hydraulic cylinders 75 in the block attachment units 70 to extend. The spring valve 129 in the main control valve 44 closes, thereby preventing fluid from flowing back to the backhoe hydraulic system 49 through the first fluid line 98. Fluid is also delivered to the arm control cylinder 50 via line 108 so that the plunger 51 extends and opens the support arms 20, 30.

After the support arms 20, 30 are extended and the sleeve members 72 are inserted into the central holes 91 on the blocks 90, the operator moves the hydraulic controls on the backhoe to close the secondary fluid line 99 that leads to the secondary hydraulic cylinders 75. When the pressure in the secondary fluid line 99 drops below 100 lbs/sq. in., as shown in FIG. 13, the spring valve 127 is released thereby allowing hydraulic fluid to flow from the arm control cylinder 50 through the control valve 44 and back to the backhoe hydraulic system 49. When the pressure drops in the secondary fluid line 99, the spring 76 in each block attachment unit 70 causes the actuator arm 73 to retract and engage the block 90. Fluid from the backhoe to the main cylinder 44 causes the plunger 51 in the arm control cylinder 50 to extend and open the support arms 20, 30.

During operation, the movement of the support arms 20, 30 and the opening of the block attachment units 70 are coordinated to easily lift blocks 90 from the pallet 95, 96 and deposit them in a linear configuration on a wall.

As stated above, the distal end of the actuator arm 73 extends into the secondary hydraulic cylinder 75. A spring 76 is disposed around the section of the actuator arm 73 located inside the secondary hydraulic cylinder 75. When hydraulic fluid is delivered to the secondary hydraulic cylinder 75, the actuator arm 73 is extended. The sleeve member 72 is then able to move freely inside the hole 91 in a block 90. When the hydraulic control valve on the backhoe is released, the spring 76 forces the actuator arm 76 upward and is retracted inside the secondary hydraulic cylinder 75, thereby causing the gripping member 80 to move outward to engage a block 90.

In compliance with the statute, the invention described herein has been described in language more or less specific as to structural features. It should be understood, however, that the invention is not limited to the specific features shown, since the means and construction shown, comprised only of the preferred embodiments for putting the invention into effect. The invention is therefore claimed in any of its forms or modifications within the legitimate and valid scope of the amended claims, appropriately interpreted in accordance with the doctrine of equivalents.

Further, the purpose of the foregoing abstract is to enable the U.S. Patent and Trademark Office personnel, patent bar practitioners, and the general public, to determine quickly from a cursory inspection the nature and essence of the technical disclosure of the application. The Abstract is neither intended to define the invention of the Application, which is measured by the claim, nor is it intended to be limiting as the scope of the invention in any way.

We claim:

1. A block lifting device, comprising:

a. two support arms pivotally connected together enabling said support arms to be disposed in an open, linear configuration or a closed, parallel configuration;

b. means for controlling the movement of said support arms between an open, linear configuration and a closed, parallel configuration;

c. at least one block attachment means attached to each said support arm for selectively attaching a block to said support arm;

d. a control means coupled to each said block attachment means for controlling said block attachment means; and, e. means for lifting said lifting device.

2. The block lifting device, as recited in claim 1, wherein said block attachment means is a downward extending sleeve that slides into a hole formed on a block, a movable actuator arm longitudinally aligned inside said sleeve, and a gripping member that selectively extends laterally from said sleeve to engage the sides of a hole on a block.

3. The block lifting device, as recited in claim 2, wherein said gripping member is a cylindrical member that rotates around a transversely aligned pin located inside said sleeve.

4. The block lifting device, as recited in claim 1, wherein said control means is a hydraulic cylinder connected to said actuator arm to longitudinally move said actuator arm inside said sleeve.

5. The block lifting device, as recited in claim 1, further including means for limiting the pivoting movement of said support arm.

6. The block lifting device, as recited in claim 1, wherein said means for controlling the movement of said support arms is a main hydraulic cylinder.

7. The block lifting device, as recited in claim 5, wherein said means for controlling the movement of said support arm is a main hydraulic cylinder.

8. The block lifting device, as recited in claim 6, wherein said hydraulic cylinder attached with each block attachment unit and said central hydraulic cylinder are connected to a single central control valve.

9. The block lifting device, as recited in claim 8, wherein said control valve is a three-way valve connected to a fluid supply line and a return line from a lifting apparatus and a fluid line connected to said main hydraulic cylinder.

10. The block lifting device, as recited in claim 9, wherein said control valve includes a spring valve disposed between said control valve and said return line.

11. The block lifting device, as recited in claim 1, wherein said means for lifting said lifting device is a bracket attached to each said support arm and a lifting cable attached to said bracket, said brackets being aligned on said support arms so that said lifting device is substantially horizontally aligned when lifted.

12. The block lifting device, as recited in claim 1, wherein each said support arm includes an extension arm with at least one block attachment means and a control means connected thereto to selectively clamp a block.

13. A lifting device for lifting a block with a vertically aligned hole, said lifting device comprising:

a. two support arms longitudinally aligned and pivotally connected together at one end;

b. a main hydraulic cylinder disposed between said support arms to move said support arms between a open, linear configuration and a close, parallel configuration;

c. at least one block attachment means mounted to each said support arm, said block attachment means being mounted on the same side of said support arm, each said block attachment means including means to selective engage the hole on a block; and, d. means for lifting said lifting device attached to each said support arm so that said support arms are horizontally aligned.

14. The block lifting device, as recited in claim 13, wherein said block attachment means is a downward extending sleeve that slides into a hole formed on a block, a movable actuator arm longitudinally aligned inside said sleeve, and a gripping member that selectively extends laterally from said sleeve to engage the sides of a hole on a block.

15. The block lifting device, as recited in claim 14, wherein said gripping member is a cylindrical member that rotates around a transversely aligned pin located inside said sleeve.

16. The block lifting device, as recited in claim 15, wherein said control means is a hydraulic cylinder connected to said actuator arm to longitudinally move said actuator arm inside said sleeve.

17. The block lifting device, as recited in claim 16, wherein said means for controlling the movement of said support arm is a secondary hydraulic cylinder.

18. The block lifting device, as recited in claim 17, wherein said hydraulic cylinder attached with each block attachment unit and said central hydraulic cylinder are connected to a central valve.

19. A lifting device for lifting a block with a vertically aligned hole, said lifting device comprising:

a. two support arms longitudinally aligned and pivotally connected together at one end;

b. a main hydraulic cylinder disposed between said support arms to move said support arms between a open, linear configuration and a close, parallel configuration;

c. at least one block attachment means mounted to each said support arm, said block attachment means being mounted on the same side of said support arm, each said block attachment means including a downward extending hollow sleeve with a side opening, a actuator arm longitudinally aligned inside said sleeve, a gripping member disposed inside said sleeve that selectively extends from said side opening as said actuator arms move longitudinally inside said sleeve, means for longitudinally moving said actuator arm, and means to selective engage the hole on a block; and, d. means for lifting said lifting device attached to each said support arm so that said support arms are horizontally aligned.

20. The lifting device, as recited in claim 19, wherein said means for moving said actuator arm is a secondary hydraulic cylinder.

* * * * *